United States Patent [19]

Palladino

[11] Patent Number: 5,638,635
[45] Date of Patent: Jun. 17, 1997

[54] LANDSCAPING BARRIER

[76] Inventor: Gregg Palladino, 5156 Isabel Av., Port Orange, Fla. 32127

[21] Appl. No.: 370,119

[22] Filed: Jan. 9, 1995

[51] Int. Cl.$^6$ .................................................. A01G 1/08
[52] U.S. Cl. ................................................... 47/33; 52/102
[58] Field of Search ................................. 47/33; 52/102; 404/7, 8

[56] References Cited

U.S. PATENT DOCUMENTS

| | | | |
|---|---|---|---|
| 1,977,021 | 10/1934 | Spencer | 47/33 |
| 3,484,989 | 12/1969 | Lazinsky | 47/33 |
| 3,485,449 | 12/1969 | Wilson | 47/33 |
| 3,520,082 | 7/1970 | Smith | 47/33 |
| 3,545,127 | 12/1970 | Jensen | 47/33 |
| 3,788,001 | 1/1974 | Balfanz, Jr. | 47/33 |
| 4,219,941 | 9/1980 | Hair | 47/33 X |
| 4,281,473 | 8/1981 | Emalfarb et al. | |
| 4,321,769 | 3/1982 | Tisbo et al. | |
| 4,644,685 | 2/1987 | Tisbo et al. | |
| 4,761,923 | 8/1988 | Reum et al. | |
| 4,809,459 | 3/1989 | Brylla et al. | |
| 4,858,379 | 8/1989 | West. | |
| 4,969,289 | 11/1990 | Trifiletti. | |
| 5,117,583 | 6/1992 | Reum | 47/33 |
| 5,121,569 | 6/1992 | Thomas. | |
| 5,201,154 | 4/1993 | Thomas. | |
| 5,274,969 | 1/1994 | Kazadikis. | |
| 5,315,780 | 5/1994 | Thomas. | |
| 5,438,804 | 8/1995 | Reum et al. | 47/33 X |

FOREIGN PATENT DOCUMENTS

| | | | |
|---|---|---|---|
| 467007 | 2/1969 | Germany | 47/33 |
| 3023309 | 1/1982 | Germany | 47/33 |

Primary Examiner—Tamara L. Graysay
Assistant Examiner—Frederick Lagman
Attorney, Agent, or Firm—Paul S. Rooy

[57] ABSTRACT

A landscaping barrier comprising an upper body, spine, and wedge attached to the spine opposite the upper body. The upper body incorporates a guide whereby a weedeater line may be guided, and which serves as a grass height cut reference to a gardener trimming grass adjacent said landscaping barrier. The wedge further incorporates a lip which serves to retain the landscaping barrier in the ground. A straight connector and a right angle connector are disclosed, which serve to connect landscaping barriers end-to-end and at a right angle respectively.

8 Claims, 4 Drawing Sheets

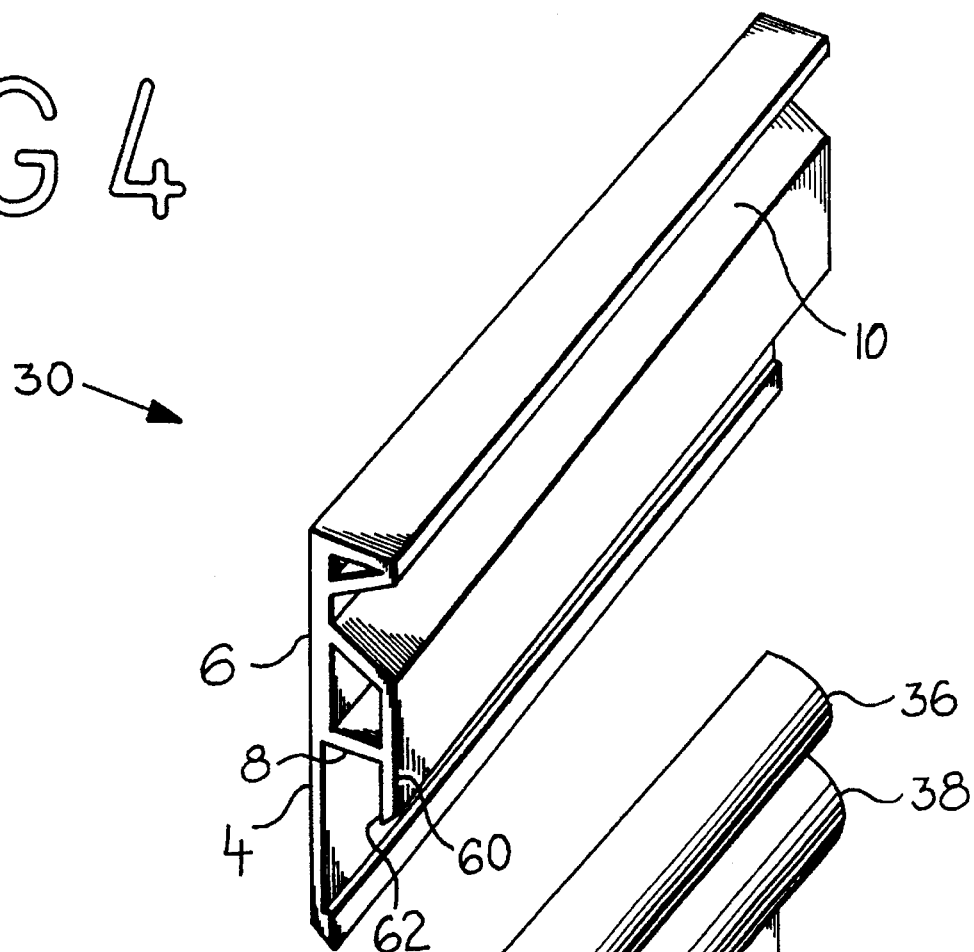
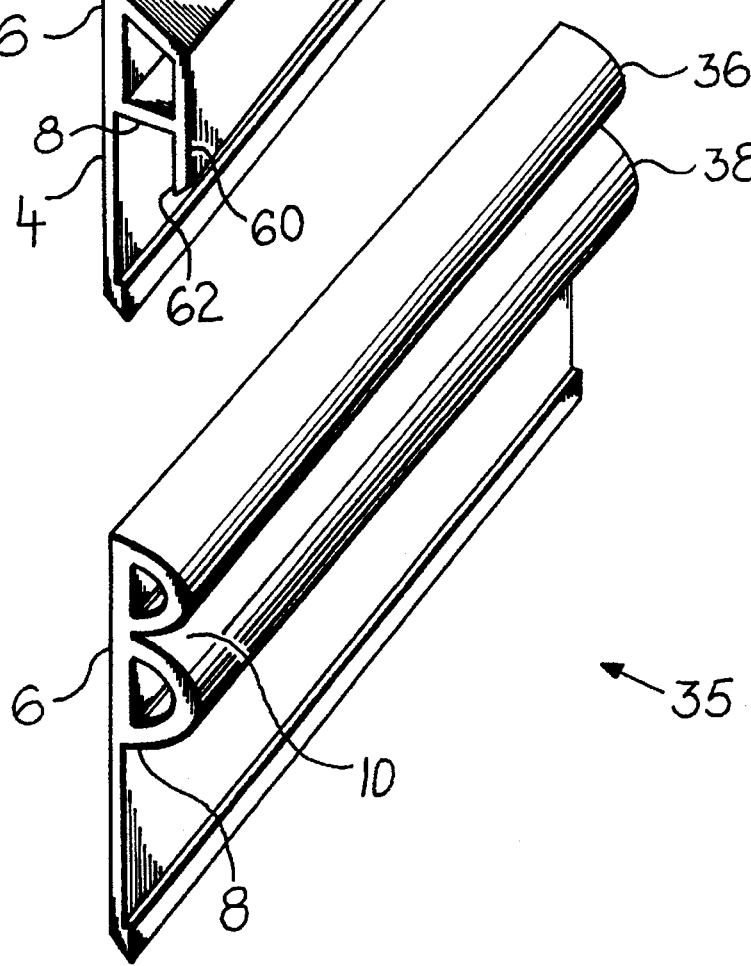

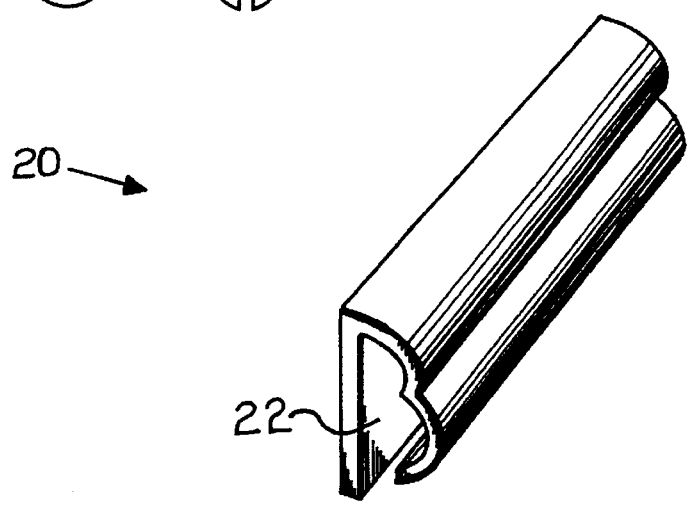
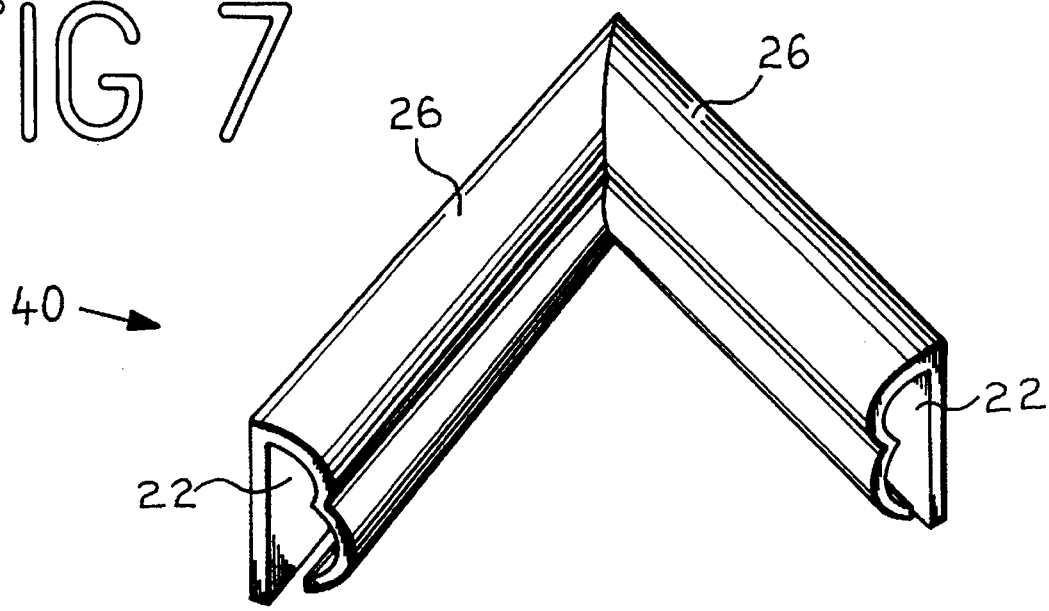

5,638,635

LANDSCAPING BARRIER

BACKGROUND OF THE INVENTION

1. Field of the Invention

This invention relates to landscaping equipment, and in particular to a landscaping barrier.

2. Background of the Invention

A common piece of landscaping equipment found in many landscaped configurations is the landscaping barrier, which serves to prevent grass from overgrowing adjacent ground, such as flower beds, etc. Thus the landscaping barrier serves to separate the lawn from the mulch covering the flower bed, or bare ground, as the case may be. Weedeaters are frequently used to trim the lawn adjacent the landscaping barrier.

Currently available barriers are typically fabricated of elastomer extrusions such as synthetic rubber or plastic, and so are somewhat flexible to accommodate lawn/flower bed curvature. Other barriers are made of metal such as aluminum. Most barriers are designed to be simply pushed into the ground, while others incorporate stakes to help hold them in place. This latter design suffers from the usual attendants of complexity: increased material cost and more difficult installation.

There are a number of problems inherent in the current landscaping barrier designs. Most lack a means to maintain the barrier erect, so the barrier tends to fall over and become ineffective.

Another problem is that current barrier designs tend to sink into the ground over time. This reduces their height above ground, and reduces their effectiveness at separating a lawn from the adjacent ground, because the grass is able to simply send out shoots into the adjacent ground over the sunken barrier.

Still another problem with existent barrier designs is that, especially in sandy soils, the barriers tend to pull out of the ground and to fall over. Laying on their sides, the barriers are ineffective in preventing the lawn overgrowing the adjacent soil. Finally, although weedeaters are often used to trim the lawn adjacent landscaping barriers in order to give the lawn/flower bed border a nice "finished" look, current landscaping barrier designs do not incorporate a weedeater line guide so as to provide the gardener with a reference to establish the correct grass cut height.

Existing Designs

A number of patents have been granted for landscape barriers. U.S. Pat. No. 4,969,289 was granted Trifdetti for a Garden Edging Device. While possessed of a horizontal segment which prevented it from sinking into the ground, it suffered from the disadvantages of not having a means to keep it from pulling out of the ground, nor of having a weedeater line guide.

U.S. Pat. No. 5,201,154 was granted Thomas for a Landscape Edging and Methods of Manufacturing Same. Although this device incorporated projections and soil sockets to keep the Edging from sinking into the ground or from coming out of the ground, these appeared dimensionally small and of questionable efficacy. In addition, the Edging lacked a means to maintain itself upright, and did not provide a weedeater line guide.

Emalfarb et al. were granted U.S. Pat. No. 4,281,473 for a landscaping bed divider. This design included upwardly canted lips to prevent the divider from sinking into the ground, but did not incorporate a means of preventing it from sinking into the ground, nor of maintaining itself upright, nor a weedeater line guide.

SUMMARY OF THE INVENTION

Accordingly, it is an object of the present invention to provide a landscaping barrier capable of maintaining itself upright. Design features allowing this object to be accomplished include a vertical spine and a horizontally disposed foot perpendicular to, and attached to, the spine. Advantages associated with the accomplishment of this object include increased utility and reduced maintenance.

It is another object of the present invention to provide a landscaping barrier which resists sinking into the ground. Design features allowing this object to be accomplished include a vertical spine and a horizontally disposed foot perpendicular to, and attached to, the spine. A benefit associated with the accomplishment of this object is increased utility in that the lawn is prevented from overgrowing adjacent ground.

It is another object of this invention to provide a landscaping barrier capable of keeping itself from pulling out of the ground. Design features enabling the accomplishment of this object include a spine, a wedge, and a lip. Advantages associated with the realization of this object include increased utility and reduced maintenance.

It is still another object of this invention to provide a landscaping barrier incorporating a weedeater line guide. Design features allowing this object to be achieved include an upper body incorporating a guide. Benefits associated with reaching this objective include easier and more accurate lawn trimming adjacent the landscaping barrier.

It is a further object of this invention to provide a landscaping barrier fabricated of inexpensive and readily available materials. A design feature permitting this object to be accomplished is one piece, extruded construction. Benefits associated with the achievement of this object include reduced cost, and consequent increased availability to the consumer.

BRIEF DESCRIPTION OF THE DRAWINGS

The invention, together with the other objects, features, aspects and advantages thereof will be more clearly understood from the following in conjunction with the accompanying drawings.

Five sheets of drawings are provided. Sheet one contains FIG. 1. Sheet two contains FIGS. 2 and 3. Sheet three contains FIGS. 4 and 5. Sheet four contains FIGS. 6 and 7.

FIG. 4 is a side isometric view of a first alternate embodiment of a landscaping barrier.

FIG. 5 is a side isometric view of a second alternate embodiment of a landscaping barrier.

FIG. 6 is a side isometric view of a straight connector for the second alternate embodiment.

FIG. 7 is a side isometric View of a right angle connector for the second alternate embodiment.

DETAILED DESCRIPTION OF THE PREFERRED EMBODIMENT

Figure 1:
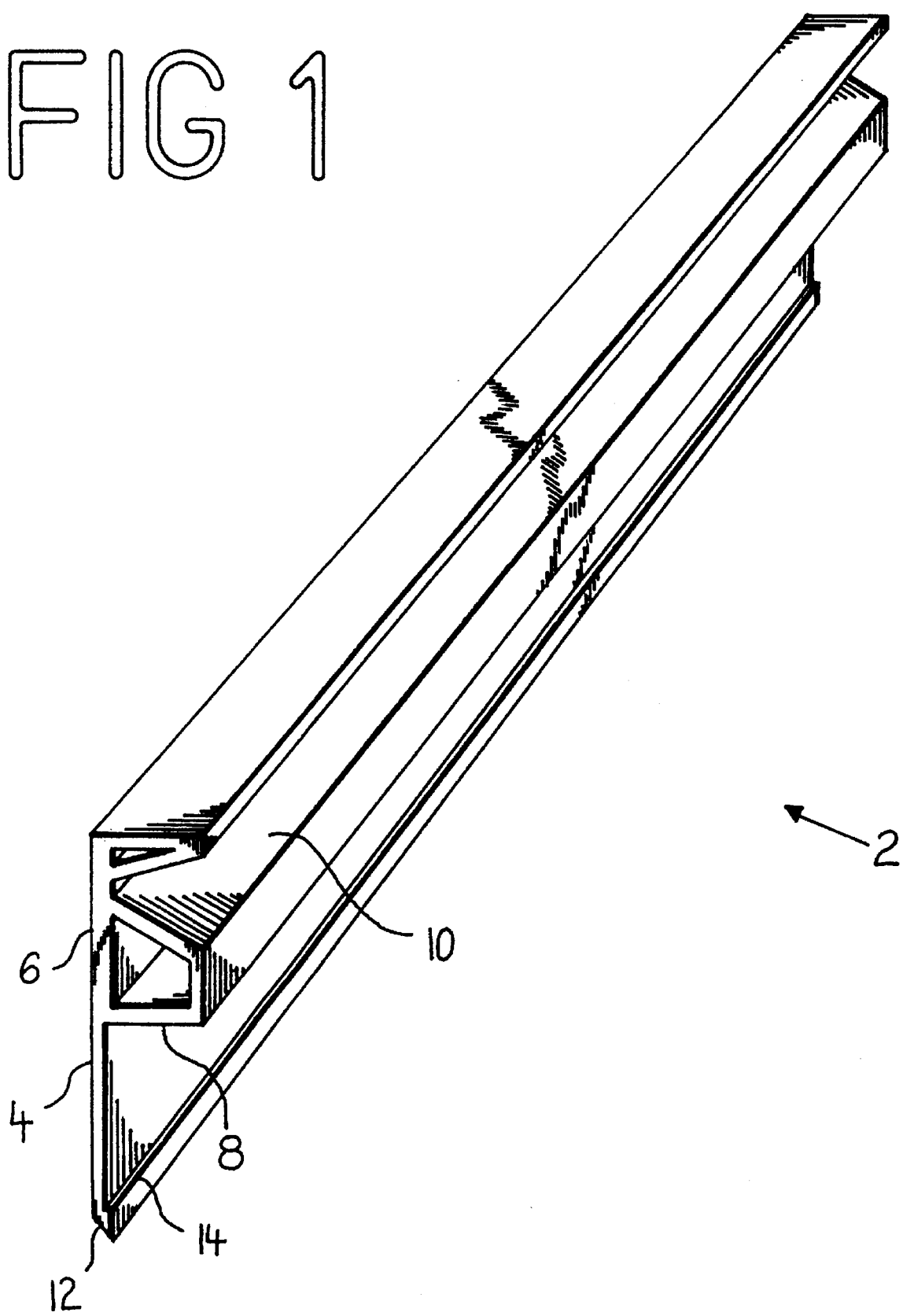
FIG. 1 is a side isometric view of a landscaping barrier.

Referring to FIG. 1 we can observe a side isometric view of landscaping barrier 2 comprising spine 4 and upper body 6. Spine 4 terminates in wedge 12 at one extreme, and upper body 6 at the extreme opposite wedge 12. Upper body 6 comprises guide 10, which is shaped like a groove and serves to guide a weedeater line when the grass adjacent barrier strip 2 is being trimmed.

Upper body 6 also comprises foot 8, which is substantially perpendicular to spine 4. Foot 8 serves two functions. First, foot 8 rests on the ground and maintains landscaping barrier 2 in an upright position. Second, foot 8 is substantially wider than spine 4, and thus prevents landscaping barrier 2 from sinking into the ground. Wedge 12 further comprises lip 14, which helps prevent landscaping barrier 2 from being pulled out of the ground.

Figure 2:
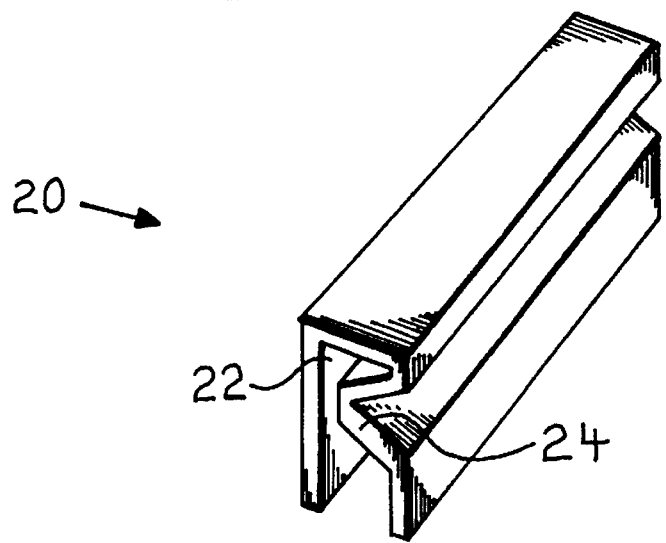
FIG. 2 is a side isometric view of a straight connector.

FIG. 2 is a side isometric view of straight connector 20, which may be used to connect two landscaping barriers 2 end-to-end. Straight connector 20 comprises void 22 incorporating guide protuberance 24. Straight connector 20 is sized to frictionally mate with the exterior of landscaping barrier upper body 6. Thus two landscaping barriers 2 may be frictionally pushed into each extreme of straight connector 20, in order to effectuate an end-to-end connection between two landscaping barriers 2.

Figure 3:
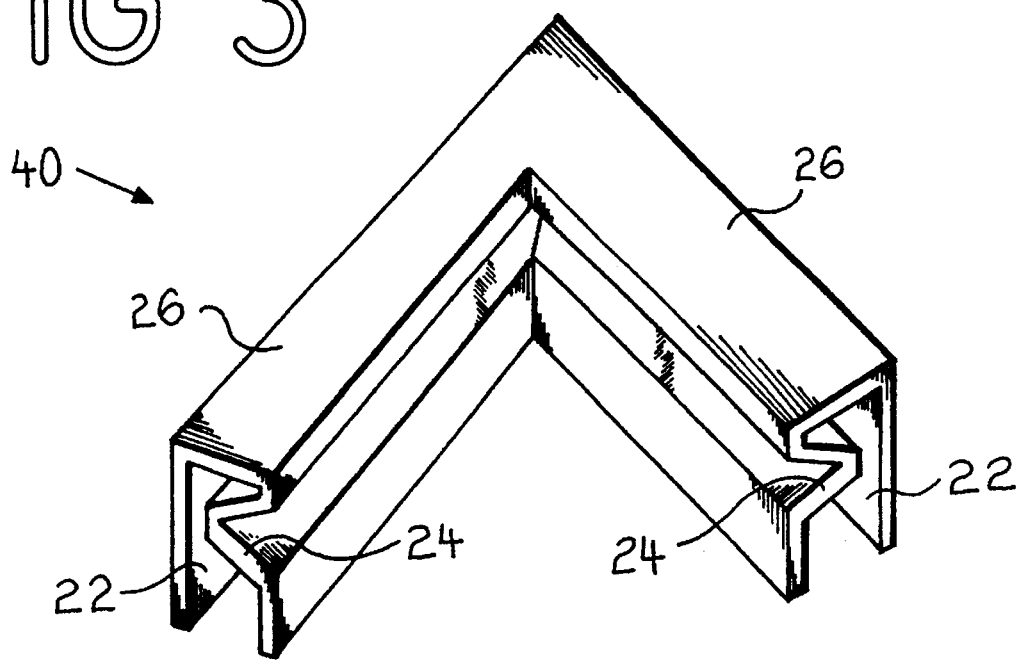
FIG. 3 is a side isometric view of a right angle connector.

FIG. 3 is a side isometric view of right angle connector 40 comprising two legs 26 which describe an angle of approximately 90 degrees. Right angle connector 40 may be used to connect two landscaping barriers 2 at right angles to each other. Each leg 26 of right angle connector 40 comprises a void 22 incorporating a guide protuberance 24. Voids 22 are sized to frictionally mate with the exterior of landscaping barrier 2. Thus two landscaping barriers 2 may be frictionally pushed into each leg 26 of right angle connector 40, in order to effectuate a 90 degree connection between two landscaping barriers 2.

FIG. 4 is a side isometric view of a first alternate embodiment 30 of a landscaping barrier 2. Second spine 60 terminating in second wedge 62 is roughly parallel to spine 4, and is attached to upper body 6 along an extreme of foot 8 opposite spine 4. Second spine 60 adds stability and increased anchoring to first alternate embodiment of landscaping barrier 30. Note that straight connector 20 and right angle connector 40 may be used to connect first alternate embodiments 30 of a landscaping barrier 2 in the same fashion as they are used to connect landscaping barriers 2 as describe above.

FIG. 5 is a side isometric view of a second alternate embodiment 35 of a landscaping barrier 2. Upper body 6 is shaped like a capital "B" in cross section. Guide 10 is defined by the junction of upper lobe 36 and lower lobe 38. Foot 8 serves to prevent second alternate embodiment 35 of landscaping barrier 2 from sinking into the ground, and guide 10 serves as a reference and weedeater line guide to the gardener trimming the grass adjacent second alternate embodiment 35. In this fashion, second alternate embodiment 35 of landscaping barrier 2 is an aesthetically attractive, yet functional, variation of landscaping barrier 2.

FIG. 6 and 7 are side isometric views of a straight connector 20 and a right angle connector 40 for second alternate embodiment 35 of landscaping barrier 2. Voids 22 are sized to frictionally mate with the exterior of second alternate embodiment 35 of landscaping barrier 2 in order to connect second alternate embodiments 35 of landscaping barrier 2 end-to-end, or in a right angle, respectively.

An additional use for landscape barrier 2 is as a house finish guard: landscape barrier 2 may be installed with spine 4 flush against the house to be protected from weedeater lines. When grass is trimmed immediately adjacent the house using a weedeater, the weedeater line hits against guide 10, not against the house itself, thereby protecting the paint on the side of the house.

Landscaping barrier 2, first alternate embodiment 30 of landscaping barrier 2, second alternate embodiment 35 of landscaping barrier 2, straight connector 20 and right angle connector 40 may be fabricated of plastic, rubber, elastomers or other appropriate materials.

While a preferred embodiment of the invention has been illustrated herein, it is to be understood that changes and variations may be made by those skilled in the art without departing from the spirit of the appending claims.

DRAWING ITEM INDEX 2 landscaping barrier
4 spine
6 upper body
8 foot
10 glide
12 wedge
14 lip
20 straight connector
22 void
24 guide protuberance
26 leg
30 first alternate embodiment
35 second alternate embodiment
36 upper lobe
38 lower lobe
40 right angle connector
60 second spine
62 second wedge

I claim:

1. A landscaping barrier comprising a spine, an upper body attached to an extreme of said spine, and a wedge attached to another extreme of said spine, said upper body comprising a foot perpendicular to said spine, said upper body comprising a guide comprising a continuous groove disposed along a tenth of said landscaping barrier, approximately parallel to said foot, whereby a weedeater line may be guided, and which serves as a grass height cut reference to a gardener trimming grass adjacent said landscaping barrier. Wherein a cross-sectional shape of said groove is a "V".

2. The landscaping barrier of claim 1 wherein said wedge further comprises a lip whereby said landscaping barrier is prevented from being pulled out of ground in which it is installed.

3. The landscaping barrier of claim 1 further comprising a second spine substantially parallel to said spine and attached to an edge of said foot opposite said spine.

4. The landscaping barrier of claim 3 wherein an extreme of said second spine opposite said upper body has a cross-sectional shape of a wedge.

5. The landscaping barrier of claim 1 wherein a cross-sectional shape of said upper body is a capital "B".

6. The landscaping barrier of claim 1 wherein a cross-sectional shape of said groove is constant along a length of said landscaping barrier.

7. The landscaping barrier of claim 1 wherein said groove is disposed on a side of said foot opposite said wedge.

8. A landscaping barrier comprising a spine, an upper body attached to an extreme of said spine, and a wedge attached to another extreme of said spine, said upper body comprising a foot perpendicular to said spine and a guide, a cross-sectional shape of said upper body being a capital "B".

* * * * *